United States Patent
Xiong et al.

(10) Patent No.: US 7,721,085 B1
(45) Date of Patent: May 18, 2010

(54) ENCRYPTION OF HIERARCHICALLY STRUCTURED INFORMATION

(75) Inventors: Yuhong Xiong, Fremont, CA (US); Robert N. Mayo, Mountain View, CA (US); Eamonn O'Brien-Strain, San Mateo, CA (US); James A. Rowson, Fremont, CA (US); Prakash Reddy, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1579 days.

(21) Appl. No.: 10/946,946

(22) Filed: Sep. 21, 2004

(51) Int. Cl.
*H04L 29/06* (2006.01)

(52) U.S. Cl. .................. 713/153; 713/182; 715/234; 380/277; 719/328; 717/168; 700/97

(58) Field of Classification Search .................. 713/153
See application file for complete search history.

(56) References Cited

U.S. PATENT DOCUMENTS

| | | | | |
|---|---|---|---|---|
| 5,333,237 A * | 7/1994 | Stefanopoulos et al. | ....... | 706/11 |
| 5,642,475 A * | 6/1997 | Itoh et al. | .................... | 345/645 |
| 5,890,147 A * | 3/1999 | Peltonen et al. | ................. | 707/1 |
| 5,905,669 A * | 5/1999 | Horita | ........................ | 365/51 |
| 6,128,773 A * | 10/2000 | Snider | ........................ | 717/132 |
| 6,208,987 B1 * | 3/2001 | Nihei | ............................ | 707/3 |
| 6,236,994 B1 * | 5/2001 | Swartz et al. | .................. | 707/6 |
| 6,487,469 B1 * | 11/2002 | Formenti | ..................... | 700/97 |
| 2004/0078577 A1 * | 4/2004 | Feng et al. | .................. | 713/182 |
| 2004/0107402 A1 * | 6/2004 | Seyrat et al. | ................. | 715/513 |
| 2004/0187103 A1 * | 9/2004 | Wickham et al. | ........... | 717/168 |
| 2005/0018853 A1 * | 1/2005 | Lain et al. | .................... | 380/277 |
| 2006/0156314 A1 * | 7/2006 | Waldorf | ...................... | 719/328 |

FOREIGN PATENT DOCUMENTS

WO     WO 02/46893     6/2002

OTHER PUBLICATIONS

Miyazaw a T. and Kushida T., "An Advanced Internet XML/EDI Model Based on Secure XML Documents", Parallel and Distributed Systems, IEEE, Iwate, Japan, Jun. 2000, pp. 295-300.
Imamura et al., "XML Encryption Syntax and Processing", WG Working Draft, W3C, Jun. 26, 2001.
Bray et al., "Extensible Markup Language (XML) 1.0 (Third Edition)", W3C Recommendation, Feb. 4, 2004.
Reddy et al., U.S. Appl. No. 10/861,292, "Verifying Incremental Updates to Hierarchicaly Structured Information", filed Jun. 4, 2004.
Reddy et al., U.S. Appl. No. 10/860,977, "Secure Incremental Updates to Hierarchicaly Structured Information", filed Jun. 4, 2004.

* cited by examiner

*Primary Examiner*—Kambiz Zand
*Assistant Examiner*—Yonas Bayou

(57) ABSTRACT

The invention provides for encryption of hierarchically structured information. In one embodiment, a method is provided for encrypting hierarchically structured information. The hierarchically structured information includes a particular node and zero or more descendent nodes, each node having a name and zero or more additional data for the node. The name of the particular node is encrypted and the encrypted name is stored. The one or more descendent nodes are stored with the parent-child relationships of the one or more descendent nodes exposed. Additional data for the particular node may be encrypted. Further, some, none or all of the data for the descendent nodes may be encrypted.

24 Claims, 4 Drawing Sheets

ENCRYPTION OF HIERARCHICALLY STRUCTURED INFORMATION

FIELD OF THE INVENTION

The present invention relates to the field of encryption and, more particularly, the present invention relates to the field of encryption of hierarchically structured information.

BACKGROUND OF THE INVENTION

A wide variety of information can be represented in a hierarchical structure. One format used for representing information in a hierarchical structure is extensible markup language (XML) format. An XML document includes an arrangement of one or more nodes containing information and parent-child relationships among the nodes.

It may be desired under a variety of circumstances to encrypt hierarchically structured information in order to prevent unauthorized access. For example, an entire XML document can be encrypted using an encryption key. Information contained in the document can be accessed by decrypting the document using an appropriate decryption key.

In certain circumstances, it may be desired to encrypt less than an entire XML document. One technique for XML document encryption is described in International Publication No. WO 02/46893, entitled, "A method and apparatus for providing XML document encryption." Another technique is described in "XML Encryption Syntax and Processing," by W3C.

Despite these techniques, there exists a need for an improved technique for encrypting hierarchical structured information, and particularly, for encrypting XML documents. It is toward this end that the present invention is directed.

SUMMARY OF THE INVENTION

The invention provides for encryption of hierarchically structured information. In one embodiment, a method is provided for encrypting hierarchically structured information. The hierarchically structured information includes a particular node and one or more descendent nodes, each node having a name and zero or more additional data for the node. The name of the particular node is encrypted and the encrypted name is stored. The one or more descendent nodes are stored with the parent-child relationships of the one or more descendent nodes exposed. Additional data for the particular node may be encrypted. Further, some, none or all of the data for the descendent nodes may be encrypted.

These and other features of the invention are described in more detail herein.

DETAILED DESCRIPTION OF A PREFERRED EMBODIMENT

Figure 1:
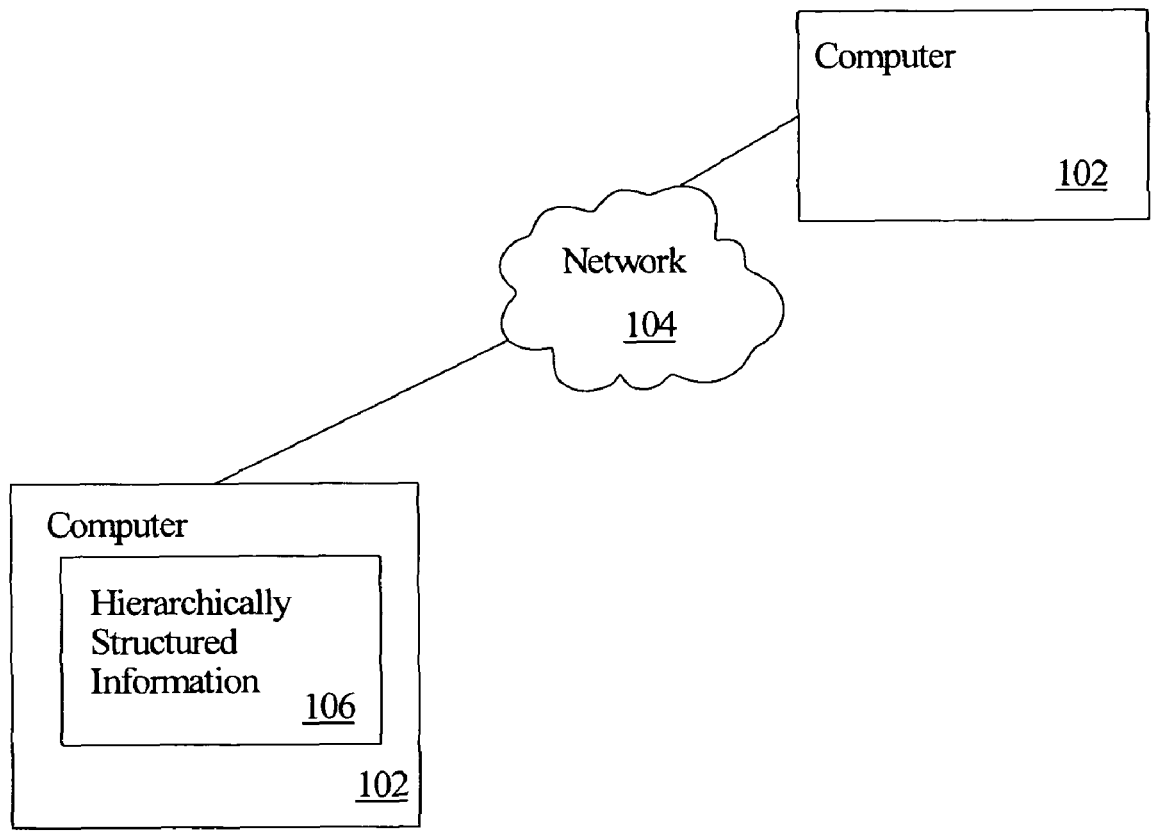
FIG. 1 illustrates a computing system in which an embodiment of the present invention may be implemented.

The invention provides for encryption of hierarchically structured information. FIG. 1 illustrates a computing system 100 in which an embodiment of the present invention may be implemented. The computing system 100 may include one or more computers 102 coupled together by a network 104. Hierarchically structured information 106 may be stored by one or more of the computers 102. In addition, one or more of the computers 102 may manipulate the hierarchically structured information 106 and may communicate the hierarchically structured information 106 to another computer 102 via the network 104. Examples of manipulation that a computer 102 may perform on the hierarchically structured information 106 include: encrypting at least a portion of the hierarchically structured information; decrypting at least a portion of the hierarchically structured information; adding to the hierarchically structured information; deleting at least a portion of the hierarchically structured information; determining differences between hierarchically structured information; merging hierarchically structured information; and updating at least a portion of the hierarchically structured information. The encryption and decryption may be performed using a conventional symmetric key encryption algorithm.

Figure 2:
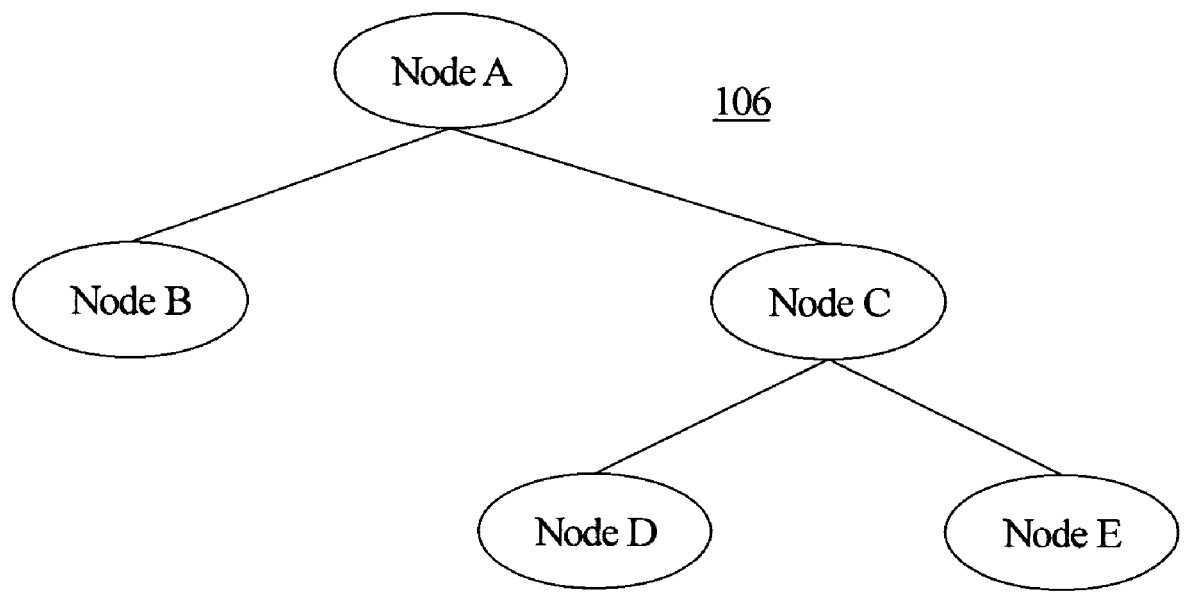
FIG. 2 illustrates an example representation of a set of hierarchically structured information in accordance with an embodiment of the present invention.

FIG. 2 illustrates an example representation of the set of hierarchically structured information 106 in accordance with an embodiment of the present invention. As shown in FIG. 2, the hierarchically structured information 106 includes a set of one or more nodes and interconnecting edges that define parent-child relationships among the nodes A-E. In the example of FIG. 2, the node A is a root node while the nodes B-E are lower level nodes with respect to the node A. The nodes B and C are child nodes of the root node A. Thus, the node A is the parent of nodes B and C and the nodes B and C are siblings. The nodes D and E are child nodes of the node C and, thus, the nodes D and E are lower level nodes with respect to the nodes A and C and are siblings. The node C is the parent of the nodes D and E. The nodes B, C, D and E are descendants of the node A, while the nodes D and E descendants of both the node A and the node C. The node B has no children and, thus, no descendants.

The hierarchical data structure may be represented using a data structure that includes one or more elements, each element having a tag and each tag including a name and zero or more attributes. The name is a string while the attributes are a mapping of a set of unordered, non-duplicated strings to string values. The hierarchical data structure also includes an unordered list of zero or more children which may either be a string or another element. An example of such a data structure is a data structure in XML format. An exemplary unencrypted XML data structure is as follows:

Example 1

```
<A a="1">
  <B b="2"/>
  <C>
    <D d="3"/>
    some text
    <E e="4"/>
    more text
  </C>
</A>
```

Each node A-E in FIG. 2 corresponds to an element of the XML structure in Example 1. Each element having child elements begins with a start tag and ends with an end-tag.

Elements that do not have child elements may have a start tag and an end tag or may have a single tag. In the example above, a start tag for node A is <A a="a"> and an end-tag for the node A is </A>; a tag for the node B is <B b="2"/>; a start tag for the node C is <C> and an end tag for the node C is </C>; a tag for the node D is <D d="3"/>; and a tag for the node E is <E e="4"/>. Angle brackets < and > identify the beginning and end of the tags. A forward slash/immediately after the angle bracket < identifies an end tag, while a forward slash immediately before the angle bracket > identifies a single tag. Each XML document contains a root node, which in this example, is the node A.

As mentioned, the tag for a node includes a name and possibly attributes. In the example above, the name of the node A is "A," the name of the node B is "B," and so forth for the remaining nodes. The tag for a node also includes zero or more attributes for the node. In the example above, an attribute of the node A is a and the value of the attribute a is 1; an attribute for the node B is b and the value of the attribute b is 2; the node C does not have any attributes; an attribute for the node D is d and the value of the attribute d is 3; and an attribute for the node E is e and the value of the attribute e is 4. While the attribute values in this example are numeric, this is not necessary.

Additional data for a node may include zero or more contents. The content of a particular node is represented between the start tag and end tag for the node and, thus, includes lower level descendent nodes of the particular node. Thus, the content of the node A includes any additional data associated with the node A, such as a text string, and also includes the nodes B, C, D and E, and any tags, attributes and text strings associated with the nodes B, C, D and E. Here, the node A does not include any text strings. The node B does not have any content. The content of the node C includes the nodes D and E and additional data associated with nodes D and E. In this way, an element can contain other elements, which can, in turn, contain other elements; thus, an XML document is hierarchical and can be represented as a tree of elements, as in FIG. 2.

The content of the node D includes a text string "some text;" and the content of the node E includes a text string "more text." While not shown explicitly in FIG. 2, these text strings are part of the hierarchical information.

Figure 3:
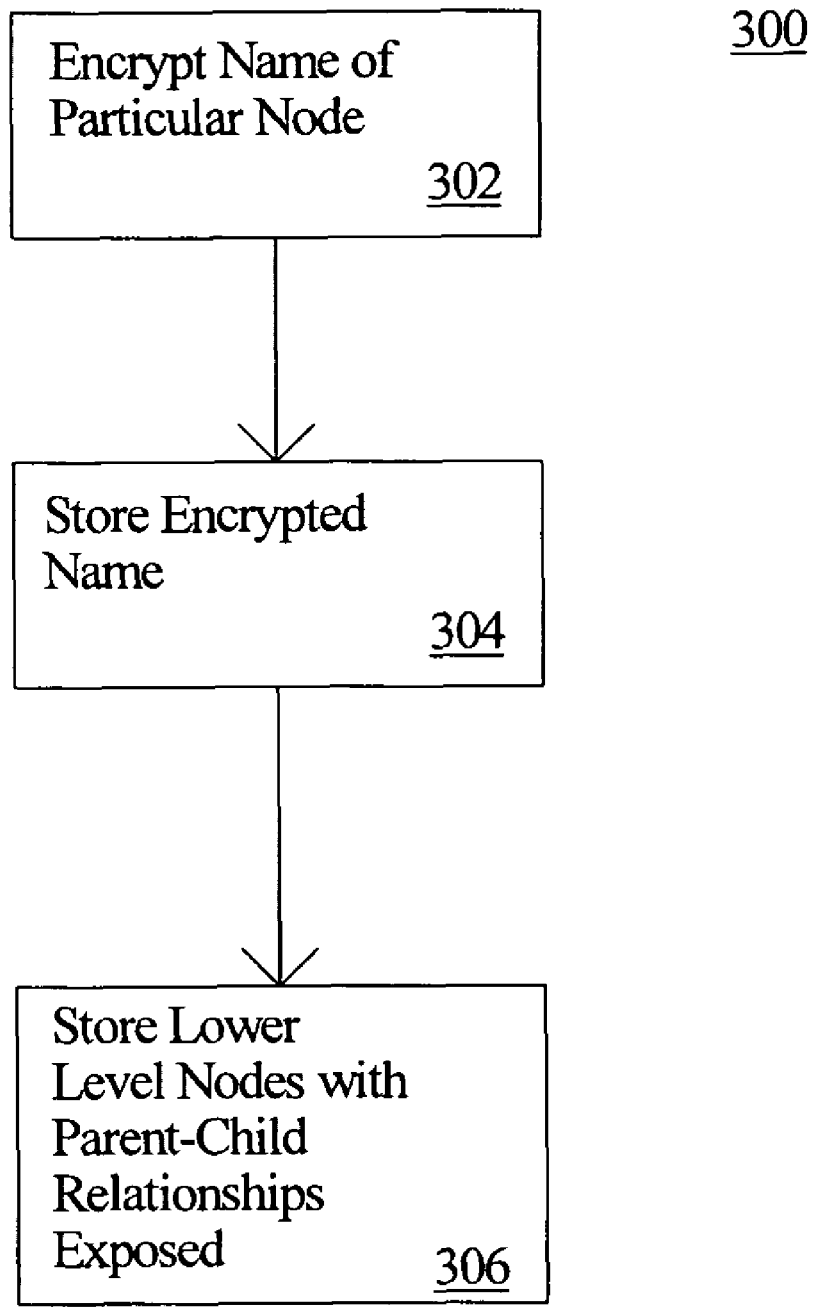
FIG. 3 illustrates a method of encrypting hierarchically structured information in accordance with an embodiment of the present invention.

FIG. 3 illustrates a flowchart 300 of a method in accordance with an embodiment of the present invention. The method of FIG. 3 may be performed by one or more of the computers 102. In a step 302, at least a name for a particular node of the hierarchically structured information is encrypted. The encrypted name may be for a root node or some other node of the hierarchically structured information. Attributes for the particular node may also be encrypted in step 302. In a step 304, the encrypted name is stored.

In a step 306 one or more nodes that are descendants of the node whose name is encrypted are stored with the parent-child relationships of those descendant nodes exposed. Data of a descendant node may be encrypted or not encrypted. Further, all or only a portion of the data for a particular descendent node may be encrypted. For example, the name, the attributes or some of the additional data for one or more descendant nodes may be encrypted. When a data for a node is encrypted, the parent-child relationships of the node are preferably exposed.

The name encrypted in step 304 is stored in place of the original unencrypted name and the remaining hierarchically structured information which descends from the node whose name is encrypted is stored according to the original structure so that the parent-child relationship of the descendent nodes are exposed.

Where data of a node and its sibling is encrypted in step 306, the data for each sibling is preferably separately encrypted from the other so that one can tell from the exposed structure of the information that the nodes are siblings. This precludes block encrypting the sibling nodes together since it would then no longer be possible to determine the exposed structure that they are both children of another node. This also precludes block encrypting a parent node with one or more of is child nodes since it would no longer be possible to identify the parent-child relationship between such block-encrypted nodes.

Examples of hierarchically structured data in XML format after performing the method of FIG. 3 are as follows:

Example 2

<enc(A a="1")>
  <enc(B b="2")/>
  <enc(C)>
    <enc(D d="3")/>
    enc(some text)<
    <enc(E e="4")/>
    enc(more text)
  </enc(C)>
</enc(A a="1")>

Herein, enc(x) indicates encryption of a data string x. In Example 2, the entire data structure is encrypted, though the hierarchical structure is exposed. More particularly, the name and attributes of the node A and the name and attributes of the node B are encrypted in this example; however, it is still possible to observe that the node B is the child of node A. Thus, the edge that defines this parent-child relationship is exposed. Similarly, the edges that define the parent-child relationships for the whole of the hierarchical information are exposed.

In Example 2, the node A has a start tag and an end tag. Thus, to maintain the document as a legal XML document, the encrypted end tag has the same value as the encrypted start tag, i.e., the end tag is encrypted as enc(A a="1") rather than enc(A). As a result, the start and end tags include matching strings. This allows the end tag to be matched with the start tag and maintains the document as a legal XML document. While it is preferred to maintain the document as an XML document, this is not necessary.

In other examples, less than all of the hierarchically structured information may be encrypted. Thus, another example of hierarchically structured data in XML format after performing the method of FIG. 3 is as follows:

Example 3

<enc(A a="1")>
  <B b="2"/>
  <C>
    <D d="3"/>
    some text
    <E e="4"/>
    more text
  </C>
</enc(A a="1")>

In Example 3 above, the start tag and the end tag for the node A are encrypted (this includes the name and attributes). However, lower level data is not encrypted. Here, the lower level data that is not encrypted includes the entire contents of the node A. Thus, in this example, the parent-child relationships of the nodes contained within the node A remain exposed.

In Example 2 above, all of the data in the hierarchical structure that is associated with descendents of the node A is encrypted, while in Example 3, none of the data of the descendents of the node A is encrypted. In other embodiments, a portion of the data for the descendent nodes may be encrypted. This is shown in the example below:

Example 4

```
<enc(A a="1")>
   <B b="2"/>
   <enc(C)>
      <enc(D d="3")/>
      enc(some text)<
      E e="4"/>
      more text
   </enc(C)>
<enc(A a="1")>
```

In Example 4 above, the tags for the nodes A, C and D are encrypted as well as the additional data for the node D (i.e. the text string "some text"), while the remaining information is not encrypted. The parent-child relationships of the descendants of the nodes A and C (whose names are encrypted) remain exposed. The node D does not have any descendents.

In the examples above, the name and attributes for the node A are encrypted. However, in other embodiments, the attributes need not be encrypted. This is shown in Example 5 below:

Example 5

```
<enc(A) a="1">
   <B b="2"/>
   <C>
      <D d="3"/>
      some text
      <E e="4"/>
      more text
   </C>
</enc(A)>
```

Example 5 is similar to Example 3 except that the attribute of the node A is not encrypted. In Example 5, the document is maintained as a legal XML document; since the attributes of the node A are not encrypted in the start tag, they are omitted from the end tag.

In the examples above, all of the original parent-child relationships and sibling relationships of descendents of the node A are exposed. In some circumstances, it may be desired to obscure some of these relationships while still leaving the relationships of at least one descendant node exposed, as shown below:

Example 6

```
<enc(A) a="1">
   <B b="2"/>
   <enc(C>
      <D d="3"/>
      some text
      <E e="4"/>
      more text
   </C)/>
</enc(A)>
```

In Example 6, the parent-child relationships of the nodes B and C remain exposed in that from the encrypted document it can be observed that B and C are both child nodes of the node A, while the parent-child relationships of the nodes D and E are obscured. More particularly, the nodes C, D and E are block encrypted (i.e., encrypted as a single block). Thus, from the encrypted document, the presence of the node C can be observed but whether the node C has any child nodes cannot be observed.

In the examples above, the name for the root node is encrypted while data for one or more descendents of the root node are stored with the parent-child relationships of those nodes exposed. In another embodiment, the node whose name is encrypted may be a node other than the root node, as shown below:

Example 7

```
<A a="1">
   <B b="2"/>
   <enc(C)>
      <enc(D d="3")/>
      enc(some text)
      <E e="4"/>
      enc(more text)
   </enc(C)>
</A>
```

In Example 7, the name for the node C is encrypted, while the data for one or more descendent nodes of the node C is stored with the parent-child relationships of those nodes exposed. More particularly, the parent-child relationships of the nodes D and E remain exposed.

Further, where the particular node whose name is encrypted is other than the root node, that node may have a sibling node. In Example 7, a particular node whose name is encrypted is the node C and its sibling is the node B. Data for the sibling node may be encrypted or not encrypted. In either case, the data structure is preferably exposed such that the relationships of a descendent of the particular node and the sibling node can be determined after encryption.

In the examples above, the tags each include a single attribute. In other examples, a tag may include multiple attributes, as shown below:

Example 8

```
<A a="1", h="7">
```

In Example 8 above, and in Examples 8, 9, 10 and 11, only a single tag is shown, but it will be understood that this tag forms a portion of a hierarchical data structure. The attributes in these examples include an attribute a having a value of 1 and an attribute h having a value of 7. These attributes may be separately encrypted, as shown below:

Example 9

```
<enc(A) enc(a)="enc(1)", enc(h)="enc(7)">
```

In Example 9, each attribute and its value are encrypted as a separate string. Here, the document is maintained as a legal XML document. Alternatively, attributes of a tag may be encrypted in combination, as shown in Example 10 and Example 11 below:

Example 10

```
<A enc(a="1", h="7")>
```

Herein, enc(x, y) indicates encryption of a combination of a data string x and a data string y. In Example 10, first and second attributes and their associated values are encrypted as a single string.

Example 11

<A enc(a,h), enc(1,7)>

In Example 11, the attributes are encrypted as a first string, while their values are encrypted as a second string. In Examples 10 and 11 of encrypted attributes, the resulting document would no longer be a valid XML document since the attributes are no longer identifiable as attributes. Thus, in another embodiment, special attributes names may be used to maintain the document as a valid XML document. In this case, Example 10 would appear as:

<A e:attrs="enc(a="1", h="7")">

And, Example 11 would appear as:

<A e:attr1="enc(a,h)", e:attr2="enc(1,7)">

In the examples above, at least some of the elements of the hierarchical data structure that are encrypted are encrypted separately from other elements. Therefore, the structure of the information is not hidden by encryption. Leaving the structure unhidden enables performance of difference and merge operations on the partially encrypted information without having to decrypt the encrypted portions. Referring to Example 4, if the tag for element D is updated such that the value for the attribute d is changed from "3" to "5," the information may appear as follows:

Example 12

```
<enc(A a="1")>
   <B b="2"/>
   <enc(C)>
      <enc(D d="5")/>
      enc(some text)
      <E e="4"/>
      more text
   </enc(C)>
</enc(A a="1")>
```

A differencing operation can detect this change, even though the entire tag for the node D is encrypted, by performing a differencing operation in which the version of the information in Example 4 is compared to the version of the information in Example 12.

Figure 4:
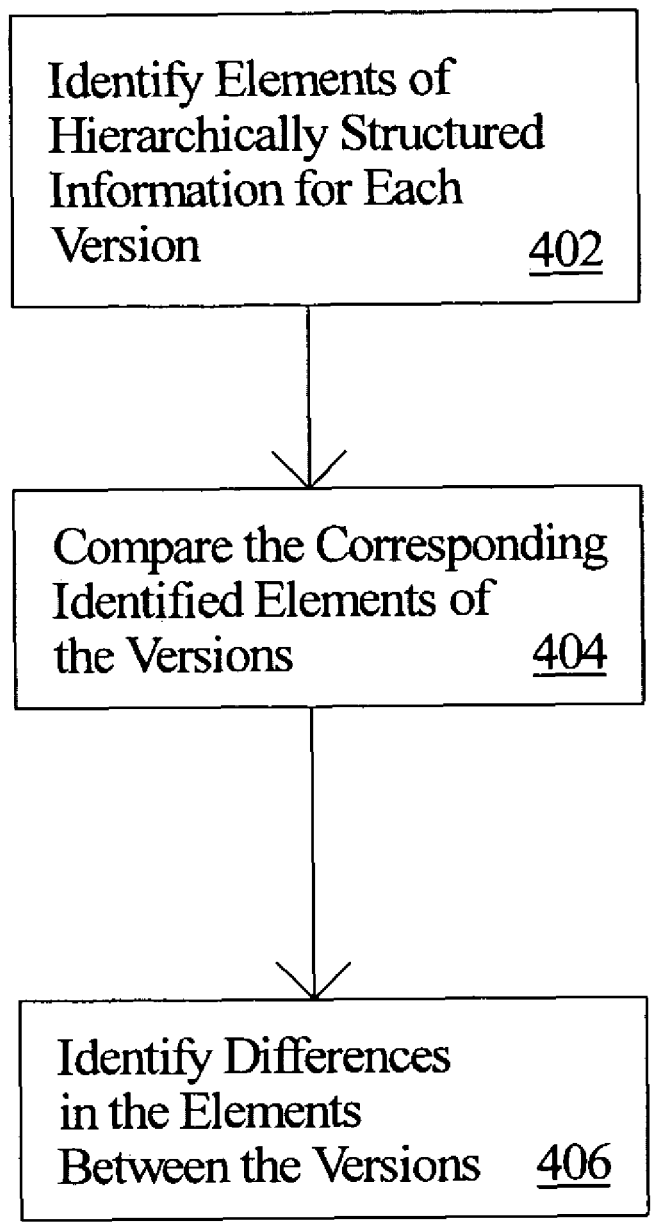
FIG. 4 illustrates a method of performing a differencing operation on encrypted hierarchically structured information in accordance with an embodiment of the present invention.

FIG. 4 illustrates a flowchart 400 of a method of performing a differencing operation on hierarchically structured information that is encrypted in accordance with an embodiment of the present invention. The method of FIG. 4 identifies differences between two sets of the hierarchically structured information. For example, the two sets may be two different modified versions of an original hierarchically structured document. This method may be implemented as a software program that is performed by a computing system, such as is shown in FIG. 1.

In a step 402, elements or nodes of hierarchically structured information and their parent-child relationships are identified for each set of the hierarchically structured information. This is possible because the structure of the information is exposed even though the information is at least partially encrypted. Referring to Example 4, the exposed structure allows the method to determine that the node A is the root node and that the nodes B and C are children of the node A, with B being the first occurring child. This can be determined based on the exposed structure of each version even though the names of the nodes A and C are obscured by encryption. In addition, the method determines that the nodes D and E are children of the node C, with the node D being the first occurring child. This can be determined based on exposed structure even though the name of the node C is obscured by encryption. Also, the method determines that the nodes D and E contain text strings, even though the string "some text" is obscured by encryption. In the example, step 402 also involves identifying the elements of the information in Example 12 and their parent-child relationships.

In a step 404, corresponding elements or nodes identified in step 402 are compared. In this step, the exposed structure of the hierarchical information is used to determine which element of each set corresponds to which element of the other set. In the example, the corresponding elements of Example 4 and Example 12 are compared to each other. This may be accomplished by an element-wise comparison in which the element A of Example 4 is compared to the element A of Example 12, the element B of Example 4 is compared to the element B of Example 12, and so forth until all of the corresponding elements have been compared.

In step 406, corresponding differences in the elements or nodes between the sets are identified based on the comparison performed in step 404. In the example, the element D is identified as differing between the versions. While the method identifies which elements differ, it does not determine how encrypted elements differ. In the example, the method identifies element D as different between the two versions but it cannot determine that a change to the value of the attribute d has caused the element D to differ. In step 406, an indicator, such as a flag for each element, may be stored along with the hierarchically stored information in order to identify elements that are different between the two sets of information.

Differences identified by the differencing operation can then be merged into a resulting hierarchical information structure by performing a merge operation. For example, assume that the information structure of Example 4 had been modified as in Example 12 by a first computer (e.g., computer 102 of FIG. 1) and that the information structure of Example 4 had also been modified as in Example 13 below by a second computer:

Example 13

```
<enc(A a="1")>
   <B b="2"/>
   <enc(C)>
      <enc(D d="3")/>
      enc(some text)
      <E e="4"/>
      new text
   </enc(C)>
</enc(A a="1")>
```

Here, Example 13 differs from Example 4 in that the text string "more text" has been replaced with the text string "new text." Assume also that it is desired to merge both of the changes of Example 12 and of Example 13 into a single document. This may be accomplished by performing the difference operation on each of Example 12 and Example 13 to identify the differences with respect to Example 4. Then, the identified portions that are different are merged into a single document, as shown below in Example 14:

Example 14

```
<enc(A a="1")>
   <B b="2"/>
   <enc(C)>
      <enc(D d="5")/>
      enc(some text)
      <E e="4"/>
``` new text
</enc(C)>
</enc(A a="1")>

As can be seen from Example 14 above, the document now includes the changes from both Example 12 and Example 13. These differencing and merging operations are performed without having to decrypt any portions of the documents and, thus, can be performed by untrusted computers without sacrificing security of the documents.

The differencing and merging operations can be performed on documents in which the entire structure is exposed and can also be performed on document in which it is desired to hide a portion of the structure of the document. As discussed above, Example 6 shows a document in which part of the structure is hidden since elements C, D and E are grouped together for encryption. In this case, difference and merge operations are performed at a coarser granularity.

In some circumstances, data strings to be encrypted may be relatively short in length. To possibly increase security for encryption, the length of the strings can be increased by including additional data, referred to as "salt," in selected data strings prior to encryption. The salt may be a random string of characters. As example of a hierarchical information structure encrypted using salt is as follows:

Example 15

<enc(f(A a="1", 2kjj34))>
  <B b="2"/>
  <enc(f(C, 2kjj34))>
    <enc(f(D d="3", 2kjj34))/>
    enc(f(some text, 2kjj34))
    <E e="4"/>
    more text
  </enc(f(C, 2kjj34))>
</enc(f(A a="1", 2kjj34))>

Herein, f(x, salt) indicates a function of a data string x and salt salt. Thus, enc(f(x, salt)) indicates encryption of this function. Example 15 is similar to Example 4, except that salt of "2kjj34" has been appended to the end of each string prior to encryption. Thus, in Example 15 above, the tags for nodes A, C and D are encrypted using the salt as is data for the node D. In another example, all of the nodes of the information structure may be encrypted using salt, as shown in Example 16 below:

Example 16

<enc(f(A a="1", 2kjj34))>
  <enc(f(B b="2", 2kjj34))/>
  <enc(f(C, 2kjj34))
    <enc(f(d="3", 2kjj34))/>
    enc(f(some text, 2kjj34))
    <enc(f(E e="4", 2kjj34))/>
    enc(f(more text, 2kjj34))
  </enc(f(C, 2kjj34))>>
</enc(f(A a="1", 2kjj34))>

In one embodiment, a computer readable media comprises computer code for implementing a method of encrypting hierarchically structured information including a particular node and one or more descendent nodes, each node having a name and zero or more additional data for the node. The method comprises encrypting the name of the particular node, storing the encrypted name and storing the one or more descendent nodes with parent-child relationships of the one or more descendent nodes exposed.

In one embodiment, a computer readable media comprises computer code for implementing a method of encrypting hierarchically structured information, including a root node and one or more lower level nodes, each node having a tag and zero or more additional data for the node. The method comprises steps of including salt with a data string of at least one node, encrypting the salt with the data string of at least one node and storing the hierarchically structured information.

According to an embodiment, data derived from an immediate parent node may be included with a data string prior to encryption. This has an effect similar to adding salt except that it possibly increases security further in that different data is used in different portions of the information structure, resulting in different encryption results even if the same text appearing in different positions is encrypted. In addition, this also makes a node's encryption dependent upon its parent node. In certain circumstances, this may be useful in that it can be verified that a child node has the correct parent, such as after a merge operation. Example 17 below shows encryption using data derived from an immediate parent node:

Example 17

<enc(A a="1", chain( ))>
  <B b="2"/>
  <enc(C, chain( ))>
    <D d="3"/>
    some text
    <E e="4"/>
    more text
  <C>
</enc(A a="1", chain( )>

Herein, chain( ) indicates a function that computes data derived from an immediate parent node. For the highest level node, chain ( ) may have a predetermined value, such as zero or a random string that is specific to the file. In the example above, the node A is encrypted, as is its child node C. However, the node B and the nodes D and E are not encrypted. In other embodiments, all of the nodes of the information structure may be encrypted using data derived from an immediate parent node, as shown in Example 18 below.

Example 18

<enc(A a="1", chain( ))>
  <enc(B b="2", chain( ))/>
  <enc(C, chain( ))>
    <enc(D d="3", chain( ))/>
    enc(some text, chain( ))<
    enc(E e="4", chain( )/>
    enc(more text, chain( ))
  </enc(C, chain( ))>
<enc(A a="1", chain( )>

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of encrypting hierarchically structured information, the hierarchically structured information including at least a first set and a second set of hierarchically structured information, including a particular node and one or more descendent nodes, each node having a name and zero or more additional data for the node, the method comprising:

encrypting the name of the particular node at a computer;

storing the encrypted name at the computer;

storing data associated with at least one descendent node of the one or more descendent nodes in unencrypted form at the computer;

storing the one or more descendent nodes with parent-child relationships of the one or more descendent nodes exposed at the computer; and performing a differencing operation on the hierarchically structured information for identifying differences between the first set and the second set of hierarchically structured information, wherein said differencing operation comprises:

identifying elements of the first set and of the second set of hierarchically structured information and their parent-child relationships at the computer:

comparing corresponding elements of the first set and of the second set of hierarchically structured information at the computer: and identifying differences between the first set and the second set of hierarchically, structured information at the computer.

2. The method according to claim 1, further comprising storing encrypted the additional data for the particular node at the computer.

3. The method according to claim 1, wherein data for at least one descendent node is encrypted at the computer.

4. The method according to claim 1, wherein data for none of the descendent nodes is encrypted at the computer.

5. The method according to claim 1, wherein each node of the hierarchical information structure that is encrypted is encrypted separately from other nodes at the computer.

6. The method according to claim 1, wherein two or more nodes are encrypted grouped together at the computer.

7. The method according to claim 1, comprising at least two descendent nodes.

8. The method according to claim 7, wherein a sibling relationship among the descendent nodes is exposed at the computer.

9. The method according to claim 1, wherein the hierarchically structured information includes a root node and wherein the particular node is the root node.

10. The method according to claim 1, wherein the hierarchically structured information: includes a root node, the particular node being other than the root node and the particular node having a sibling node, and further comprising encrypting data for the sibling node at the computer.

11. The method according to claim 1, wherein the hierarchically structured information is included in an XML document.

12. The method according to claim 11, wherein the XML document includes a tag including the name and one or more attributes.

13. The method according to claim 12, further comprising encrypting one or more attributes of the tag at the computer.

14. The method according to claim 13, wherein encrypting the one or more attributes of the tag comprises encrypting a first attribute of the tag as a first string and encrypting its value as a second string at the computer.

15. The method according to claim 13, wherein encrypting the one or more attributes of the tag comprises encrypting a first attribute of the tag and its value as a first string and encrypting a second attribute of the tag and its value as a second string at the computer.

16. The method according to claim 13, wherein encrypting the one or more attributes of the tag comprises encrypting two or more attribute as a first string, and encrypting values of the two or more attributes as a second string at the computer.

17. The method according to claim 1, further comprising including salt in a data string of the hierarchical information structure prior to encrypting the data string at the computer.

18. The method according to claim 1, further wherein data derived from an immediate parent node is included with a data string prior to encrypting the data string at the computer.

19. The method according to claim 1, further comprising merging the identified differences to form a resulting hierarchically structured information.

20. A method of encrypting hierarchically structured information, the hierarchically structured information including at least a first set and a second set of hierarchically structured information, including a root node and one or more descendent nodes, each node having a name and zero or more additional data for the node, the method comprising:

including salt with data string of at least one node;

encrypting the salt with the data string of at least one node at the computer;

storing the hierarchically structured information at the computer; and performing a differencing operation on the hierarchically structured information for identifying differences between the first set and the second set of hierarchically structured information, wherein said differencing operation comprises:

identifying elements of the first set and of the second set of hierarchically structured information and their parent-child relationships at the computer:

comparing corresponding elements of the first set and of the second set of hierarchically structured information at the computer: and identifying differences between the first set and the second set of hierarchically, structured information at the computer.

21. The method according to claim 20, wherein the hierarchically structured information is included in an XML document.

22. The method according to claim 20, wherein said including comprises including salt prior to encrypting each data string of the hierarchically structured information at the computer.

23. A computer readable media comprising computer code for implementing a method of encrypting hierarchically structured information, the hierarchically structured information including at least a first set and a second set of hierarchically structured information, including a particular node and one or more descendent nodes, each node having a name and zero or more additional data for the node, the method comprising:

encrypting the name of the particular node;

storing the encrypted name;

storing data associated with at least one descendent node of the one or more descendent nodes in unencrypted form; and storing the one or more descendent nodes with parent-child relationships of the one or more descendent nodes exposed; and performing a differencing operation on the hierarchically structured information for identifying differences between the first set and the second set of hierarchically structured information, wherein said differencing operation comprises:

identifying elements of the first set and of the second set of hierarchically structured information and their parent-child relationships:

comparing corresponding elements of the first set and of the second set of hierarchically structured information: and identifying differences between the first set and the second set of hierarchically, structured information.

24. A computer readable media comprising computer code for implementing a method of encrypting hierarchically structured information, the hierarchically structured information including at least a first set and a second set of hierarchically structured information, including a root node and one or more lower level nodes, each node having a tag and zero or more additional data for the node, the method comprising steps of:

including salt with data string of at least one node;

encrypting the salt with the data string of at least one node;

storing the hierarchically structured information; and performing a differencing operation on the hierarchically structured information for identifying differences between the first set and the second set of hierarchically structured information, wherein said differencing operation comprises:

identifying elements of the first set and of the second set of hierarchically structured information and their parent-child relationships:

comparing corresponding elements of the first set and of the second set of hierarchically structured information: and identifying differences between the first set and the second set of hierarchically, structured information.

* * * * *